United States Patent
Nishikawa

[11] Patent Number: 6,032,180
[45] Date of Patent: *Feb. 29, 2000

[54] IMAGE DATA TRANSMISSION SYSTEM, VIDEO SERVER UNIT, AND CLIENT UNIT FOR DISPLAYING IMAGE DATA

[75] Inventor: Katsuhiko Nishikawa, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,421

[22] Filed: Mar. 31, 1997

[30] Foreign Application Priority Data

Sep. 26, 1996 [JP] Japan .................................. 8-254191

[51] Int. Cl.⁷ .................................................. H04N 7/14
[52] U.S. Cl. .............................. 709/217; 348/7; 714/18; 714/748; 370/394
[58] Field of Search ........... 395/200.61, 200.62–200.63, 395/200.47; 348/1–5, 6–13; 455/2–6.5; 371/32, 33; 714/18, 748, 749; 370/394, 428

[56] References Cited

U.S. PATENT DOCUMENTS

| | | | |
|---|---|---|---|
| 4,439,859 | 3/1984 | Donnan | 371/32 |
| 4,829,524 | 5/1989 | Yoshida | 371/32 |
| 4,896,151 | 1/1990 | Kuranami et al. | 340/825.52 |
| 5,091,849 | 2/1992 | Davis | 395/100 |
| 5,130,792 | 7/1992 | Tindell et al. | 358/85 |
| 5,151,899 | 9/1992 | Thomas et al. | 370/94.1 |
| 5,151,901 | 9/1992 | Shenoi et al. | 370/521 |
| 5,222,061 | 6/1993 | Doshi et al. | 370/394 |
| 5,227,876 | 7/1993 | Cuuchi et al. | 358/133 |
| 5,245,616 | 9/1993 | Olson | 370/394 |
| 5,371,532 | 12/1994 | Gelman et al. | 348/7 |
| 5,614,955 | 3/1997 | Rackman | 348/487 |
| 5,627,970 | 5/1997 | Keshav | 370/394 |
| 5,648,970 | 7/1997 | Kapoor | 370/394 |
| 5,652,614 | 7/1997 | Okabayashi | 348/7 |
| 5,664,091 | 9/1997 | Keen | 714/18 |
| 5,712,848 | 1/1998 | Deutsch | 370/521 |
| 5,712,992 | 1/1998 | Hawkins et al. | 395/877 |
| 5,754,754 | 5/1998 | Dudely et al. | 714/18 |
| 5,765,186 | 6/1998 | Searby | 711/100 |
| 5,768,528 | 6/1998 | Stumm | 395/200.47 |
| 5,889,790 | 3/1999 | Fukuda | 714/748 |
| 5,935,267 | 8/1999 | Hayakawa | 714/748 |

OTHER PUBLICATIONS (Halsall, Data Communications, Networks and Open Systems, pp. 189–194, 199–200), 1995.

Fred Halsall, Data Communication, Computer Networks and Open Systems, p. 248, Jan. 1, 1996.

*Primary Examiner*—Andrew I. Faile
*Assistant Examiner*—Reuben M. Brown
*Attorney, Agent, or Firm*—Staas & Halsey

[57] ABSTRACT

An image data transmission system for displaying image data comprises a video pump unit for forwarding image data to a client unit, which comprises data loss detection unit for detecting a loss of image data transmitted from said video pump unit and resend request generating means for generating a resend request to request of the video pump unit a resend of the lost image data. The video pump unit comprises a buffer for storing forwarded image data and resends the lost image data to the client unit in response to the resend request after reading image data from the buffer.

27 Claims, 11 Drawing Sheets

| NUMBER | SEQUENCE NUMBER | BUFFER ADDRESS |
|---|---|---|
| 1 | | |
| 2 | | |
| | | |
| N | | |

MPTRr ->

MPTRw ->

IMAGE DATA TRANSMISSION SYSTEM, VIDEO SERVER UNIT, AND CLIENT UNIT FOR DISPLAYING IMAGE DATA

BACKGROUND OF THE INVENTION

1. Field of the Invention

The present invention relates to a image data transmission system, a video server unit, and a client unit used for a video on demand (VOD) system in which image data (video) are transmitted through a network.

2. Description of the Related Art

Recent years have seen significant advances in the area of high speed networks and information compression techniques, and image data transmission is becoming increasingly popular. In this situation, the VOD system, which enables users to watch favorite videos and films in any location, including homes and offices at any desired time, is expected to be popularized as one of the more important applications in the age of multimedia applications.

In a conventional VOD system, the ATM (Asynchronous Transfer Mode) is applied to the transmission of image data and the UDP (User Datagram Protocol) is used as a protocol for the transmission of image data.

However, the problem of data loss of the image data transmission before a client unit displays the image, does not take into account the image data transmission according to the ATM and the UDP protocol. If the loss of image data in the transmission is caused because of, for example, insufficient capability of the client unit, the image to be displayed becomes disordered and awkward, which is an undesirable problem.

SUMMARY OF THE INVENTION

In view of the foregoing, the object of the present invention is to provide a video image data transmission in which a real time image (video) display without disorders or interruptions can be realized.

An image data transmission system according to the present invention comprises: a video pump unit for forwarding image (video) data and a client unit. The video pump unit comprises: a storage unit for storing forwarded image data, and a control unit for reading image data from the storage unit and transmitting the read image data in response to a resend request. The client unit comprises a data loss detection unit for detecting a loss of image data transmitted from the video pump unit, and a resend request generating unit for generating a resend request.

The video pump unit attaches a sequence number to image data to be transmitted for each transmission unit. The data loss detection unit of the client unit detects the loss of image data based on the sequence numbers attached to the image data.

The video pump unit can transmit image data at a speed faster than a transmission speed required to display the image data in real time.

The control unit of the video pump unit can suspend transmission of image data in response to a suspension request received from the client unit. The control unit can restart the transmission of image data after the expiration of a predetermined time interval, if the transmission of image data is suspended.

The client unit may further comprise a temporary storage unit for temporarily storing image data received from the video pump unit, and a send suspension request generating unit for sending a suspension request to the video pump unit when an available space in the temporary storage unit becomes smaller than a predetermined amount.

A video pump unit according to the present invention forwards image data (video data) to a client unit for displaying image data. The video pump unit comprises: a storage unit for storing the same image data as transmitted to the client unit; a resend request detection unit for detecting a resend request issued by the client unit when a loss of image data transmitted to the client unit is detected; a control unit for reading image data from the storage unit in response to the resend request; and a data sending unit for transmitting image data read by the control unit to the client unit.

A client unit according to the present invention displays image data (video data) received from a video pump unit. The client unit comprises: a data loss detection unit for detecting a loss of image data transmitted from the video pump unit and outputting a data loss detection signal; and a resend request generating unit for generating a resend request for requesting the video pump unit to resend the lost image data.

An image data transmission method according to the present invention is for transmitting image data (video data) to be displayed from a video pump unit to a client unit. This image data transmission method comprises the steps of: storing the same image data as transmitted to the client unit from the video pump unit; detecting a loss of image data in a transmission from the video pump unit to the client unit; requesting a resend of the lost image data to the video pump unit; and resending the lost image data to the client unit in response to a resend request.

A storage medium readable by a computer according to the present invention tangibly embodies a program of instructions executable by the computer to perform the method steps for forwarding image data to be displayed to a client unit. These method steps comprise the steps of: storing the same image data as transmitted to the client unit; detecting a data resend request issued by the client unit when a loss of image data in a transmission to the client unit is detected; and resending the lost image data to the client unit in response to the resend request.

Another storage medium readable by a computer according to the present invention tangibly embodies a program of instructions executable by the computer to perform method steps for displaying image data received from a video pump unit. This method steps comprises the steps of: detecting a loss of image data in a transmission from the video pump unit; and requesting a resend of the lost image data to the video pump unit in response to the detection of the loss of image data.

DESCRIPTION OF THE PREFERRED EMBODIMENT

Figure 1:
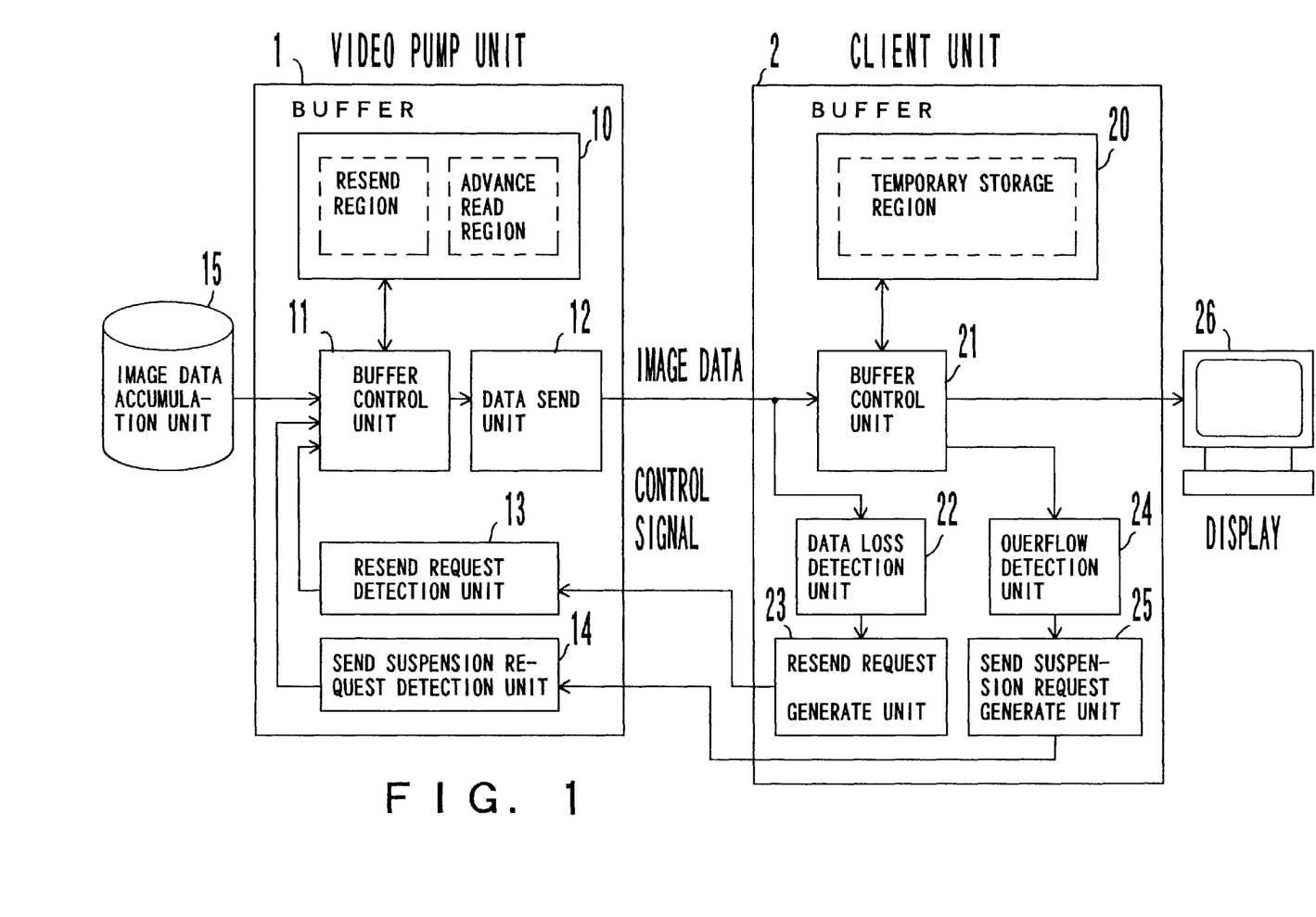
FIG. 1 shows a configuration of the image data transmission system according to the present invention.

FIG. 1 is a block diagram showing a configuration of an image data transmission system according to the present invention.

This image data transmission system comprises an image data accumulation unit 15 for accumulating image data (video data), a video pump unit (video server) 1 which transmits video data received from the image data accumulation unit 15, a client unit 2 for displaying images according to the image data received from the video pump unit 1, and a display (monitor) 26 which displays images.

The video pump 1 comprises a buffer 10 including a resend region and an advance read region for image data, a buffer control unit 11 which controls the reading/writing of image data from/to the buffer 10, a data send unit 12 for transmitting image data to the client unit 2 through a network, a resend request detection unit 13 which detects a resend request sent from the client unit 2, and a send suspension request detection unit 14 which detects a send suspension request from the client unit 2.

The resend region of the buffer 10 accumulates the same image data as previously transmitted to the client unit 2 in preparation for any disappearance of the image data, and the advance read region accumulates a sufficient amount of image data to transmit image data at a speed faster than a bit rate inherent in the image data to be transmitted. Writing and reading of the image data of the buffer 10 are controlled by the buffer control unit 11.

The client unit 2 comprises a buffer 20 for temporary accumulating image data, a buffer control unit 21 which controls the reading/writing of image data from/to the buffer 20, a data loss detection unit 22 which detects the loss of image data in the data transmission, a resend request generate unit 23 which generates and issues a resend request, an overflow detection unit 24 which detects or predicts an overflow of a temporary storage region of the buffer 20, and a send suspension request generate unit 25 which generates and issues a send suspension request.

The data send unit 12 of the video pump unit 1 sends image data to the client unit 2 at a speed faster than a transmission speed required for displaying or reproducing images, which is an original transmission speed for reproducing the image data, in preparation for any loss of the image data and the resend of the disappeared image data.

The data loss detection unit 22 of the client unit 2 detects the loss of image data based on the sequence numbers attached to the image data, and the resend request generate unit 23 issues and sends a resend request of the lost image data to the video pump unit 1, when a loss of image data occurs in the image data transmission and is detected by the data loss detection unit 22.

If the resend request detection unit 13 detects a resend request in a control signal from the client unit 2, the buffer control unit 11 of the video pump unit 1 reads from the resend region of the buffer 10 the image data which was previously sent to the client unit 2, but is still stored in the resend region, and sends the read image data to the client unit 2 through the data send unit 12.

The buffer 20 of the client unit 2 temporary accumulates image data, which are sent from the video pump unit 1 at a speed faster than a speed corresponding to a bit rate inherent in the image data to be displayed, in the temporary storage region. If the overflow detection unit 24 detects that the temporary storage region is becoming full, the send suspension request generate unit 25 generates and issues a send suspension request, which is sent to the video pump unit 1 as a control signal.

If a send suspension request is detected in the control signal from the client unit 2, the send suspension request detection unit 14 of the video pump unit 1 sends to the buffer control unit 11 a detection signal. Based upon this detection signal the buffer control unit 11 controls the buffer 10 and the data send unit 12 so that the reading and sending of image data is suspended. After a predetermined time interval, the buffer control unit 11 restarts reading and sending the image data.

According to the image data transmission system having the above described configuration, the client unit 2 can display the image without disorders and interruptions in real time, if the loss of image data occurs in the data transmission from the video pump 1 to the client unit 2.

Figure 2:
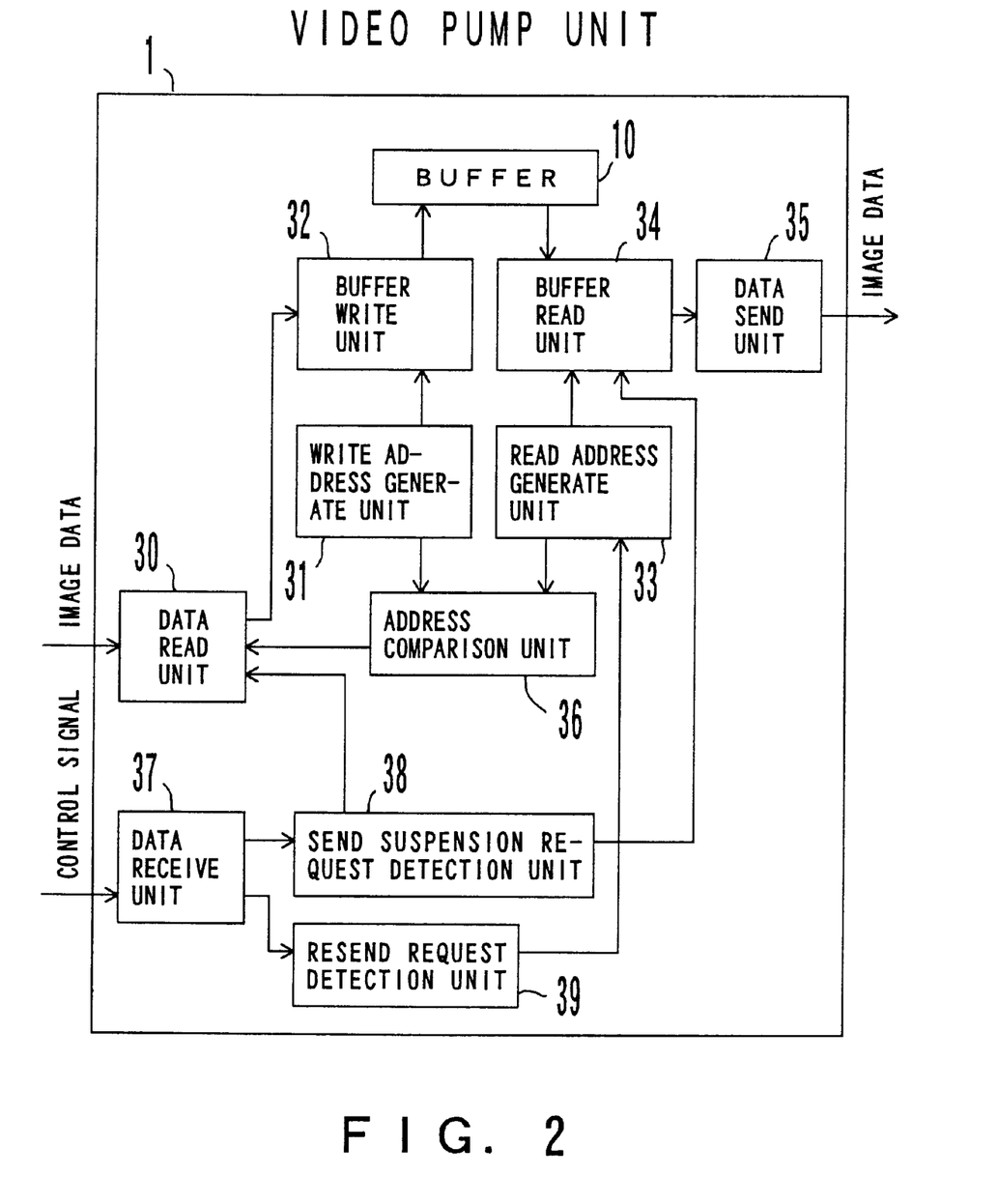
FIG. 2 shows a configuration of the video pump unit according to the present invention.
Figure 3:
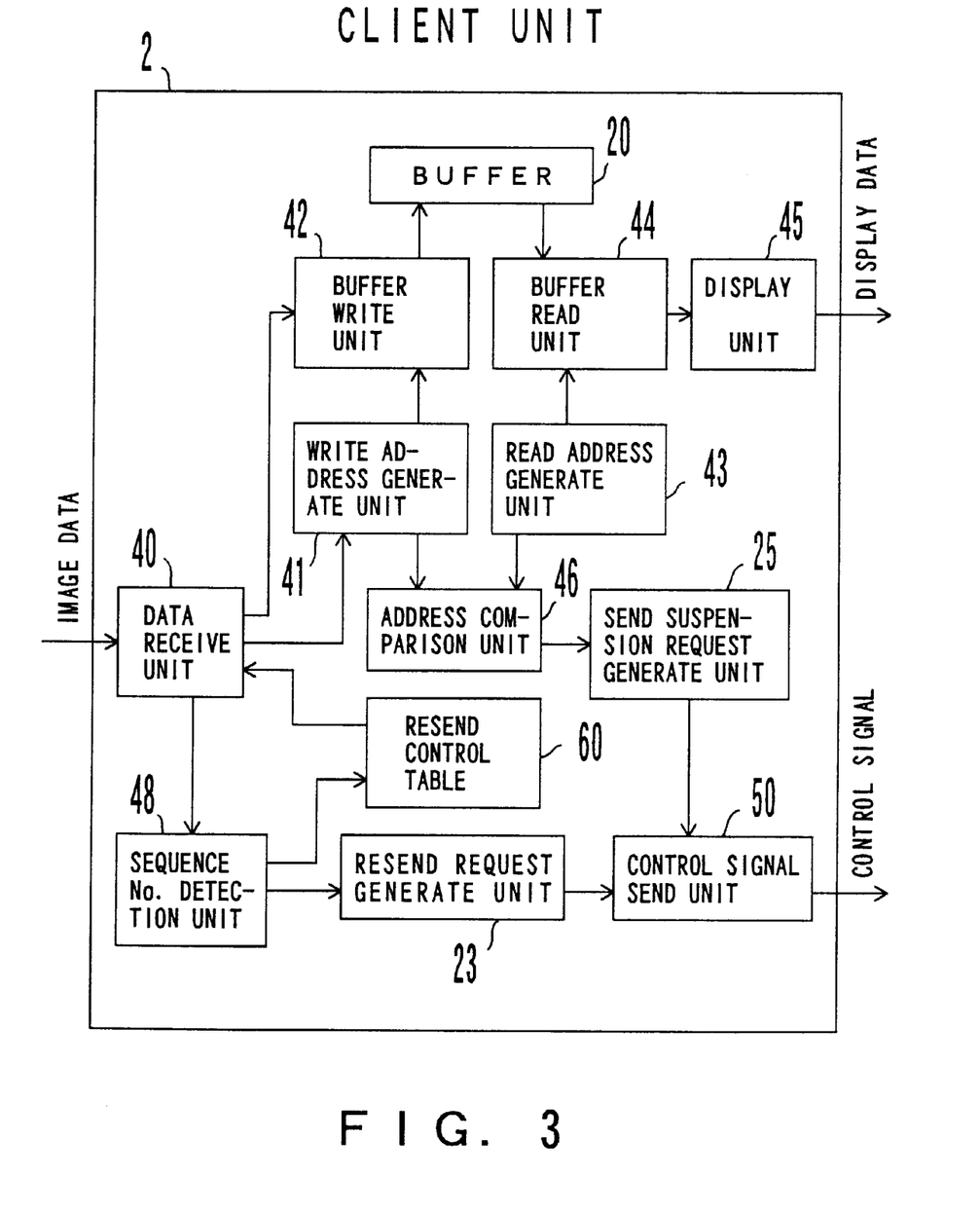
FIG. 3 shows a configuration of the client unit according to the present invention.

FIGS. 2 and 3 show detailed configurations of the video pump unit 1 and the client unit 2, respectively.

As shown in FIG. 2, the video pump unit 1 comprises a data read unit 30, a write address generate unit 31, a buffer write unit 32, a read address generate unit 33, a buffer read unit 34, and an address comparison unit 36, which are included in the buffer control unit 11 in FIG. 1. The data receive unit 37 in the video pump unit 1 is used for receiving the control signal from the client unit 2.

As shown in FIG. 3, the client unit 2 comprises a data receive unit 40, a write address generate unit 41, a buffer write unit 42, a read address generate unit 43, a buffer read unit 44, and a display unit (display controller) 45, which are included in the buffer control unit 21 in FIG. 1. The address comparison unit 46 in FIG. 3 corresponds to the overflow detection unit 24 in FIG. 1, and the sequence No. detection unit 48 and the resend control table 60 in FIG. 3 are included in the data loss detection unit 22 in FIG. 1. The control signal send unit 50 in the client unit 2 is used for sending the control signal to the video pump unit 1.

The video pump unit 1 and the client unit 2 are connected through a network. The data read unit 30 of the video pump unit 1 reads out image data accumulated in the image data accumulation unit 15, which is realized by, for example, a disc storage medium. The read image data are written by the buffer write unit 32 in a portion of the buffer 10 which corresponds to an address generated by the write address generate unit 31.

The image data stored in the buffer 10 are read out by the buffer read unit 34 from the portion indicated by an address generated by the read address generate unit 33, and sent to the data send unit 12. The data send unit 12 attaches a sequence number indicating the sequence of the image data to be transmitted to the client unit 2 through the network for each transmission unit of image data. After that, the data send unit 12 transmits the image data to the client unit 2 at, for example, 9 Mbps. This transmission speed is faster than an original transmission speed of the image data, which is, for example 6 Mbps in the MPEG transmission standard and corresponds to a transmission speed from the client unit 2 to the display 26 for displaying the video images.

The buffer 10 includes the advance read region which stores image data before the transmission to the client unit 2, and the resend region which stores image data previously transmitted to the client unit 2, the amount of which is equal to or more than a predetermined amount, in preparation for any disappearance of image data. The address comparison unit 36 compares the numbers of the corresponding storage regions of the write address and the read address, maintains the space of the buffer 10 so that the difference between the numbers of the corresponding resend regions the write address and the read address does not become less than a predetermined value, and provides instructions of the previous reading of the image data to the data read unit 30.

The data receive unit 37 receives the control signal from the client unit 2. The send suspension request detection unit 14 decides whether or not the control signal received at the data receive unit 37 is a send suspension request, and, if so, suspends the reading of the image data from the buffer 10. After a predetermined interval, the buffer read unit 34 and the data send unit 12 restart the reading and sending of the image data.

The resend request detection unit 13 decides whether or not the control signal received by the data receive unit 37 is the resend request, and, if so, the read address generate unit 33 generates an address of the buffer 10 corresponding to a sequence number indicated by the resend request. Then, the buffer read unit 34 reads image data from a region of the buffer 10 indicated by the generated address, and transmits the read image data through the data send unit 12.

The client unit 2 receives the image data transmitted from the video pump unit 1 at the data receive unit 40. The image data received by the data receive unit 40 are written into the buffer 20 by the buffer write unit 42 at a region indicated by an address generated by the write address generate unit 41. The image data stored in the buffer 20 are read out by the buffer read unit 44 in units of a predetermined amount from regions indicated by addresses generated by the read address generate unit 43, and transmitted to the display 26 through the display unit 45.

The address comparison unit 46 compares the numbers or the corresponding storage regions of the write address and the read address. If it is determined that the temporary storage region of the buffer 20 is becoming full because the amount of written image data in the buffer 20 is larger than that of the reading image data from the buffer 20, the address comparison unit 46 sends a detection signal to the send suspension request generate unit 25. On receiving the detection signal, the send suspension request generate unit 25 issues a send suspension request to the video pump unit 1 as the control signal through the control signal send unit 50.

The sequence No. detection unit 48 of the client unit 2 extracts a sequence number from image data received by the data receive unit 40, and checks whether or not the sequence number is an intended (expected) sequence number. If the detected sequence number is different from the intended sequence number or an advanced sequence number ahead of the intended sequence number, the sequence No. detection unit 48 determines that a disappearance of image data has occurred in the transmission, and notifies the resend request generate unit 23 of the disappearance of the image data. On receiving the notification, the resend request generate unit 23 issues a resend request of the image data corresponding to the sequence number which was not detected by the data receive unit 40, and sends a control signal indicating the resend request to the video pump unit 1 through the control signal send unit 50.

Figure 4A:
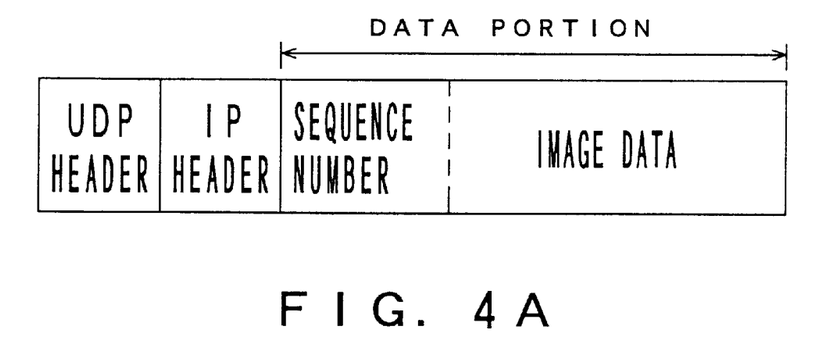
FIG. 4A shows an example of a configuration of transmission data according to the present invention.

FIG. 4A shows an example of a configuration of transmission data according to the UDP/IP used in this embodiment.

The UDP protocol is basically used in the data transmission between the video pump unit 1 and the client unit 2 of this embodiment. However, such a disappearance of transmission data is not considered in the UDP protocol. Accordingly, in the transmission data according to the present invention, a sequence number, which is used for detecting the disappearance of data, is attached before the image data field in the data portion following a UDP header field and a IP header field, as shown in FIG. 4A.

Figure 4B:
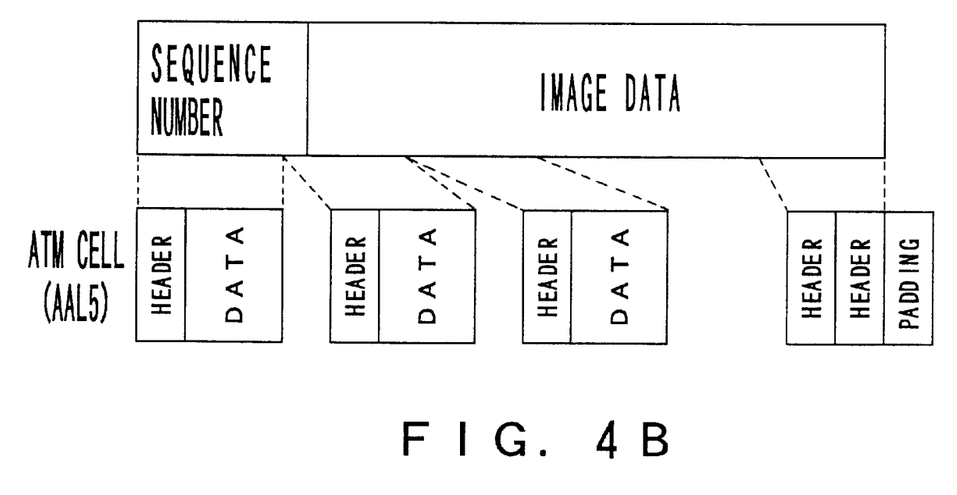
FIG. 4B shows a configuration of transmission data according to the ATM cell format.

The present invention is also applicable to a transmission system using the ATM cell format. When the present invention is applied to the transmission according to the cell format, transmission data of the configuration shown FIG. 4B is used for the transmission.

Figure 5A:
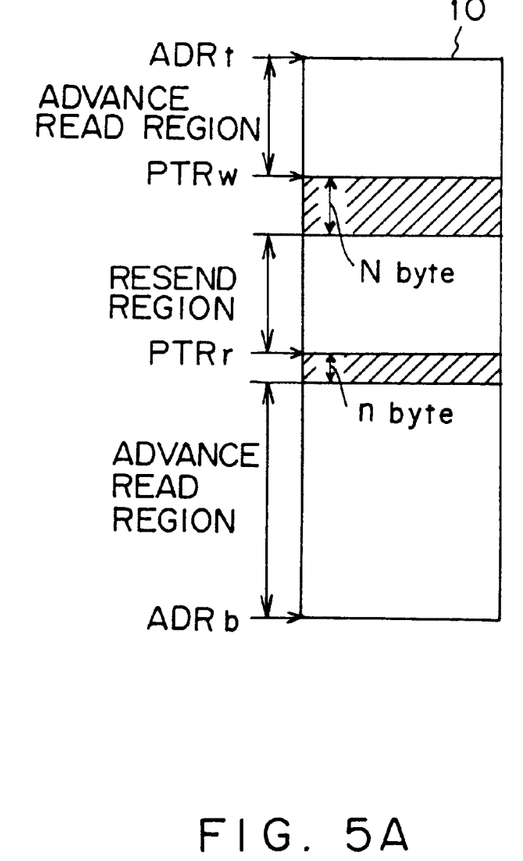
FIG. 5A shows an example of a configuration of a buffer in the video pump unit according to the present invention.

FIG. 5A indicates a configuration of the buffer 10 of the video pump unit 1. The symbols in this figure have the following meanings:

ADRt—leading address of the buffer 10;

ADRb—end address of the buffer 10;

PTRw—write pointer (write address) of the buffer 10;

PTRr—read pointer (read address) of the buffer 10;

N—reading unit from the image data accumulation unit 15 in FIG. 1 (writing unit to the buffer 10); and n—sending unit (reading unit) from the buffer 10.

The size of the buffer 10 is, for example, about N*10 byte, and the sizes of N and n, which depend on the transmission speed, are for example, 100 Kbyte and 1 Kbyte, respectively, if a transmission speed of 6 Mbps is used. In this case, the suspension period w determined by the send suspension request is, for example, 100 ms.

The buffer 10 is used in rotation from the leading address ADRt to the end address ADRb. The advance read region of the buffer 10 corresponds to the portion from the read pointer PTRr to the write pointer PTRw, in which image data to be initially (originally) transmitted are stored. The resend region of the buffer 10 corresponds to the portion from the point N after the write pointer PTRw (PTRw+N) to the read pointer PTRr, in which image data already transmitted (or the same image data as transmitted before) to the client unit 2 are stored. Note that, in the first write cycle of the buffer 10, the portion from the leading address ADRt to the read pointer PTRr becomes the resend region, and the portion from the write pointer PTRw to the end address ADRb becomes an empty region.

Figure 5B:
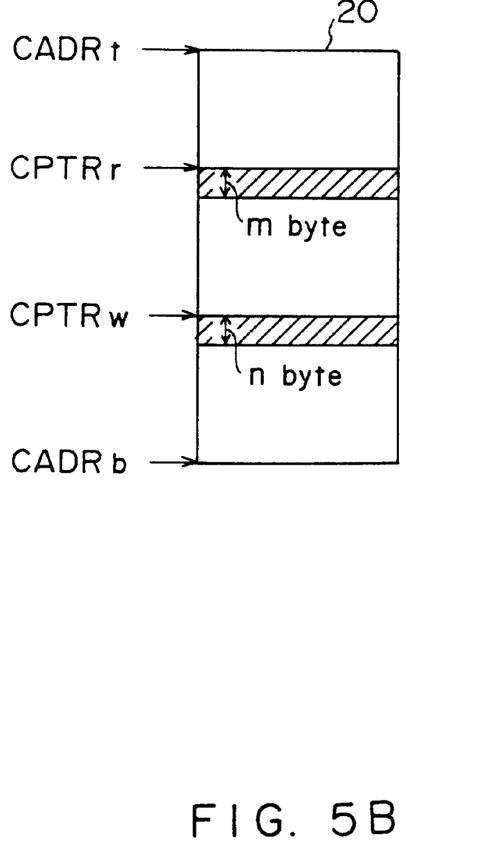
FIG. 5B shows an example of a configuration of a buffer in the client unit according to the present invention.

FIG. 5B indicates a configuration of the buffer 20 of the client unit 2. Symbols in this figure indicate the following meanings:

CADRt—leading address of the buffer 20;

CADRb—end address of the buffer 20;

CPTRw—write pointer (write address) of the buffer 20;

CPTRr—read pointer (read address) of the buffer 20;

m—reading unit from the buffer 20; and n—writing unit to the buffer 10.

The sizes of m and n, which depend on the transmission speed, are for example, 1 Kbyte and 1 Kbyte, respectively, if a transmission speed of 6 Mbps is used.

The buffer 20 is also used in rotation from the leading address CADRt to the end address CADRb. Whether or not the buffer 20 is becoming full is determined by the difference between the read pointer CPTRr and the write pointer CPTRw. If this difference becomes equal to or less than a predetermined threshold value L, the overflow detection unit 24 determines that the buffer 20 is becoming full, and the send suspension request generate unit 25 issues the send suspension request. When a transmission speed of 6 Mbps is used, the predetermined threshold value L is about 200 Kbyte, and the size of the buffer 20 is about L*3, which is 600 Kbyte.

Figure 6:
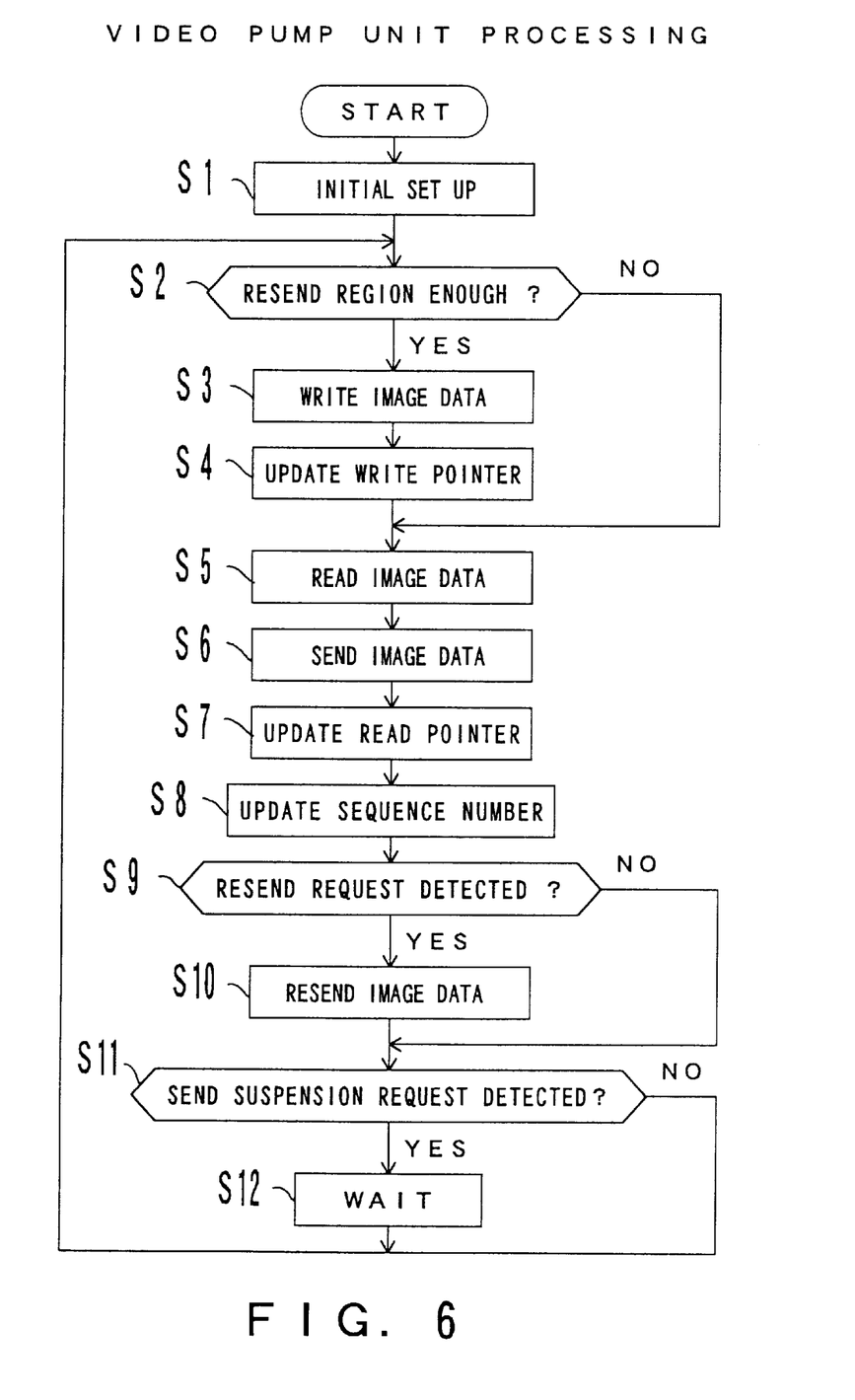
FIG. 6 is a flowchart showing a process of the video pump unit according to the present invention.

FIG. 6 is a flowchart indicating a process of the video pump unit 1.

In step S1, an initial set up process is performed, wherein the write pointer PTRw and the read pointer PTRr of the buffer 10 are set to the leading address ADRt of the buffer 10, and the value of a sequence number S to be attached to the image data to be sent is set to 1.

PTRw=ADRt;

—PTRr=ADRt; and

—S=1.

In step S2, it is determined whether or not the resend region is large enough, in preparation for storing the image data which are already sent to the client unit 2. If the resend region is large enough (YES, in step S2), the process goes to step S3, and, if not (NO, in step S2), step S5 is performed.

In the determination process of step S2, the following processes are performed. Here, it is noted that at least, for example, 3*N (N is a reading unit size of the image data accumulation unit 15) byte must be dedicated to the resend region.

(1) Whether or not the value of PTRr-N*3 is smaller than ADRt is determined.

(2) If so, a value p, which is a work variable used for a comparison in the following process (4), is set as follows;

$$p=PTRr-N*3+ADRb-ADRt$$

This process is an adjustment process necessary for the use in rotation of the buffer 10.

(3) If PTRr-N*3 is not smaller than ADRt, p is set as;

$$p=PTRr-N*3$$

(4) PTRw+N is compared to p, and the resend region is determined to be large enough (YES, in step S2), if PTRw+N is smaller than p. If it is not smaller than p (NO, in step S2), the process goes to step S5 without performing steps S3 and S4, in order to find sufficient space for the resend region in the buffer 10.

In step S3, image data of N byte are read from the image data accumulation unit 15 shown in FIG. 1 and written in the buffer 10 at the position indicated by the write pointer PTRw.

In step S4, the write pointer PTRw is updated as follows.

(1) New PTRw=PTRw+N (2) If PTRw+N becomes equal to or more than the end address ADRb, the new PTRw is set to the ADRt.

In step S5, image data of n byte are read from a region pointed by the read pointer PTRr in the buffer 10, and the sequence number S is attached to the top of the image data.

In step S6, the image data is transmitted to the client unit 2.

In step S7, the read pointer PTRr is updated as follows.

(1) New PTRr=PTRr+n (2) If PTRr+n becomes equal to or more than the end address ADRb of the buffer 10, the new PTRr is set to ADRt.

In step S8, the sequence number S is updated as follows. In this case, the maximum number of the sequence number S is, for example, 10000, and the next sequence number after 10000 is set to 1.

(1) New S=S+1

(2) If S exceeds 10000, S=1

In step S9, the resend request detection unit 13 determines whether or not a resend request is received by the data receive unit 37. If the data receive unit 37 has received a resend request (YES, in step S9), the process goes to step S10, and if not, the process goes to step S11.

In step S10, an address of the buffer 10 corresponding to the sequence number indicated by the send request is determined, and image data in a region corresponding to the address is read and sent to the client unit 2, if there is image data left in the region.

In step S11, the send suspension request detection unit 14 determines whether or not the send suspension request is received by the data receive unit 37. If the data receive unit 37 has received a send suspension request (YES, in step S11), the process goes to step S12, and if not, the process goes back to step S2.

In step S12, the image data transmission is suspended for a predetermined time w, after which the process goes back to step S2. Here, the value of w is, for example, 100 ms when the image data transmission speed is 6 Mbps.

The above described steps S2 through S12 are repeated. If a termination command is sent from the client unit 2 or all of the image data are transmitted to the client unit 2, this process is terminated.

Figure 7:
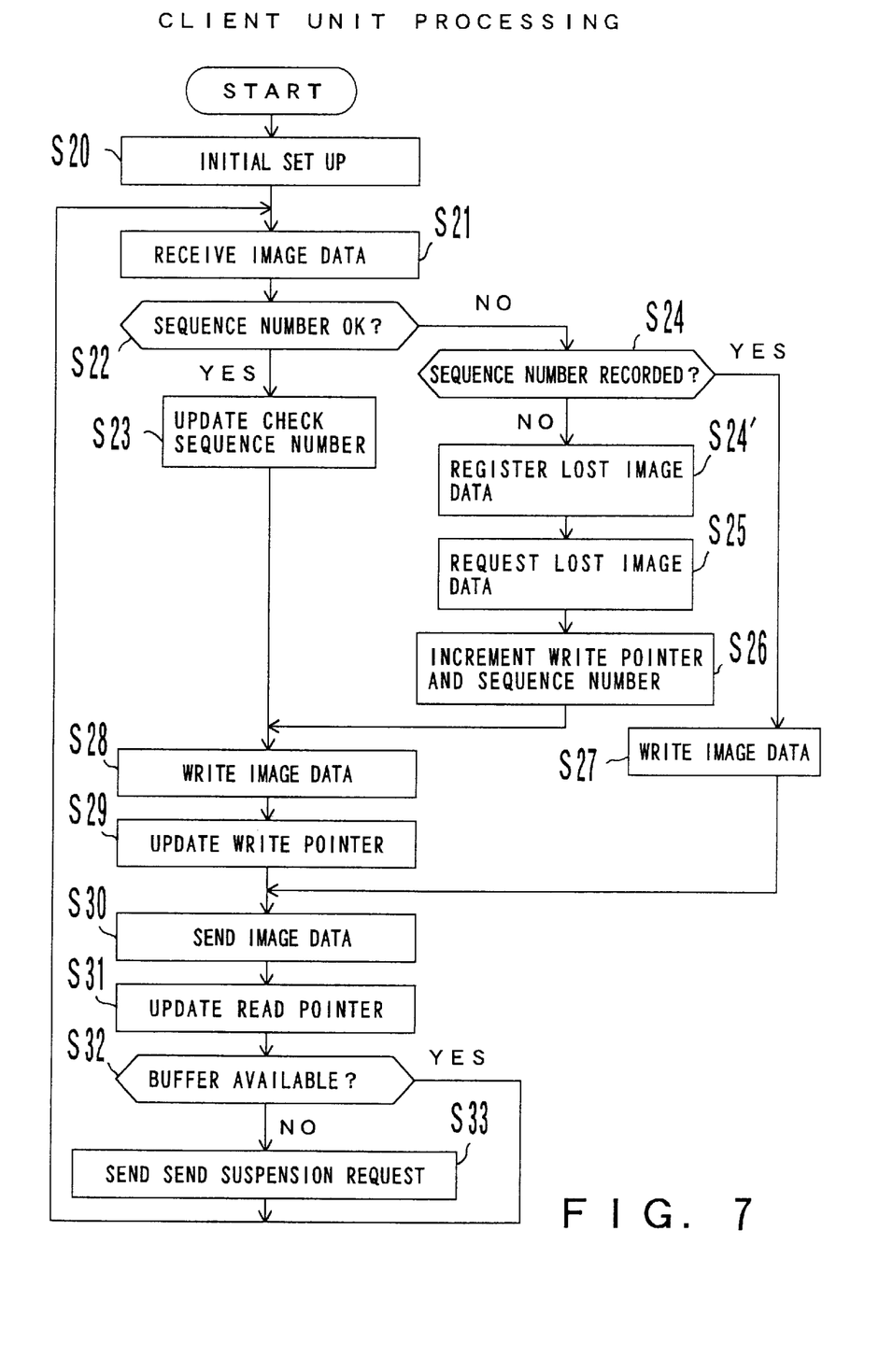
FIG. 7 is a flowchart showing a process of the client unit according to the present invention.

FIG. 7 is a flowchart indicating a process of the client unit 2.

In step S20, an initial set up process is performed, wherein the write pointer CPTRw and the read pointer CPTRr of the buffer 20 are set to the leading address CADRt of the buffer 10, and the value of a sequence number CS for checking the image data received from the video pump unit 1 is set to 1. The sequence number CS is managed in the client unit 2 in order to check a sequence number of image data to be received next. In addition, a write pointer MPTRw and a read pointer MPTRr of the resend control table 60 are set to 1.

CPTRw=CADRt;

CPTRr=CADRt;

CS=1;

MPTRw=1; and

MPTRr=1.

Figure 8:
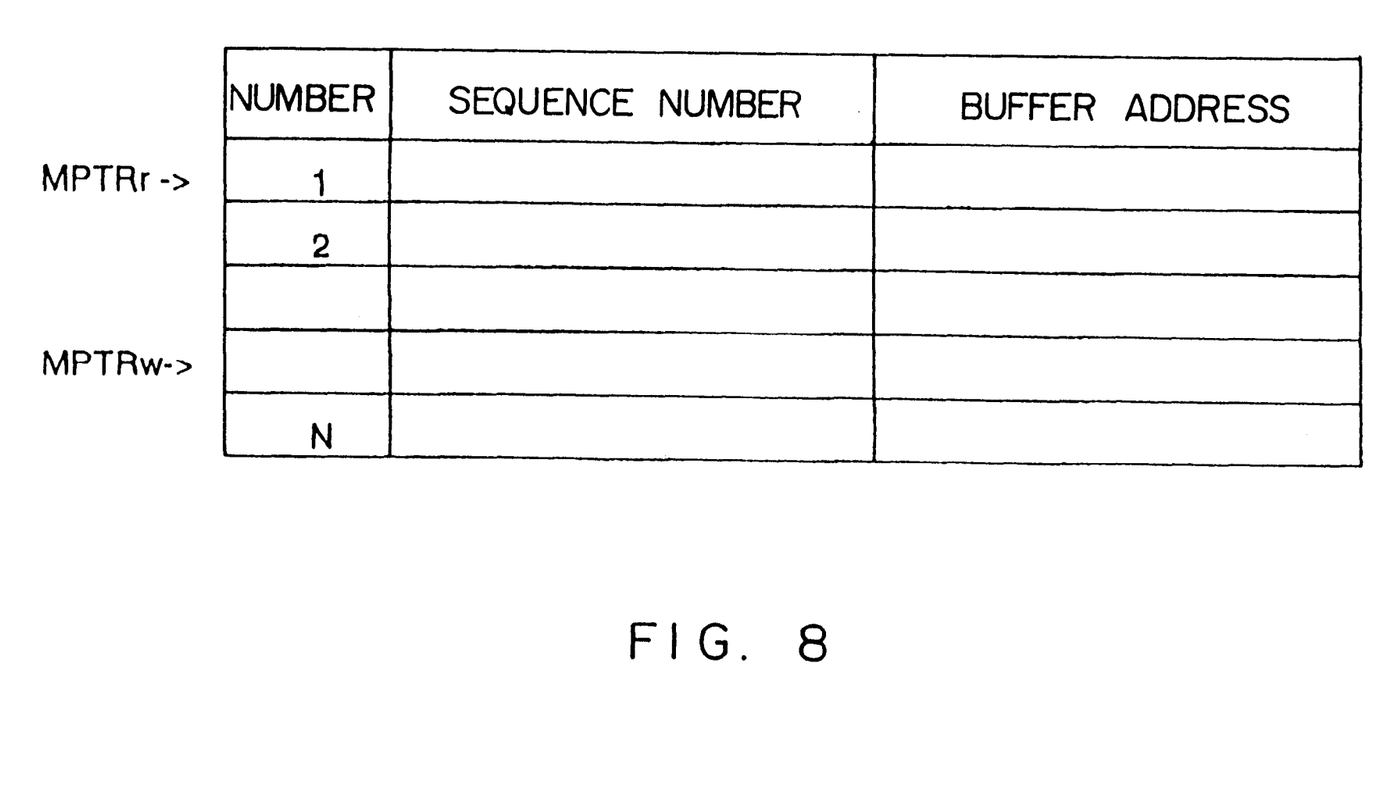
FIG. 8 shows a configuration of a resend control table according to the present invention.

FIG. 8 shows a configuration of the resend control table 60.

A sequence number of image data which is requested to be resent is written in the sequence number column of the resend control table 60 and an address of the buffer 20 at which the image data is to be stored is written in the buffer address column of the resend control table 60. When image data is transmitted from the video pump unit 1, whether or not a sequence number attached to the image data has been written in the sequence number column is checked, and, if so, the image data is determined to be data resent from the video pump unit 1 in response to a resend request. The maximum number N of the resend control table 60 is set to, for example, 300, when the transmission speed is 6 Mbps.

In step S21, the client unit 2 receives image data from the video pump unit 1.

In step S22 it is determined whether or not a sequence number S attached to the received image data matches to the sequence number CS of client unit 2. If these sequence numbers match (YES, in step S22), the process goes to step S23, and, if not (NO, in step S22), it goes to step S24.

In step S23, the sequence number CS is updated as follows.

(1) CS=CS+1

(2) If CS exceeds 10000, CS=1

Here, the maximum number of the sequence number CS is, for example, 10000, and the next sequence number after 10000 is set to 1.

In step S24, whether or not the image data received in step S21 corresponds to data requested to be resent is determined. In this step, if MPTRr is equal to MPTRw, the image data is not regarded as the data requested (NO, in step S24), and the process goes to step S24'. In other cases, it is determined whether or not the sequence number S attached to the image data exists in a range of the line numbers between MPTRr and MPTRw-1 in the resend control table 60. If the sequence number S does not exist in the range, the process goes to step S24'. If it exists, the image data is recognized as the data requested to be resent, and the process goes to step S27 after MPTRr is updated to be a new value which is the corresponding sequence number plus 1. When the new MPTRr becomes larger than N, the new MPTRr is set to 1.

In step S24', image data which is not received is registered in the resend control table 60, in which a sequence number corresponding to the lost image data is stored in a line pointed by MPTRw of the sequence number column, and the write pointer CPTRw at which the lost image data should be stored is written in the corresponding line of the buffer address column. After that, 1 is added to the write pointer MPTRw. If the new value of the write pointer MPTRw exceeds N, the value of the write pointer MPTRw is set to 1.

In step S25, a resend request for the lost image data is sent to the video pump unit 1.

Figure 9:
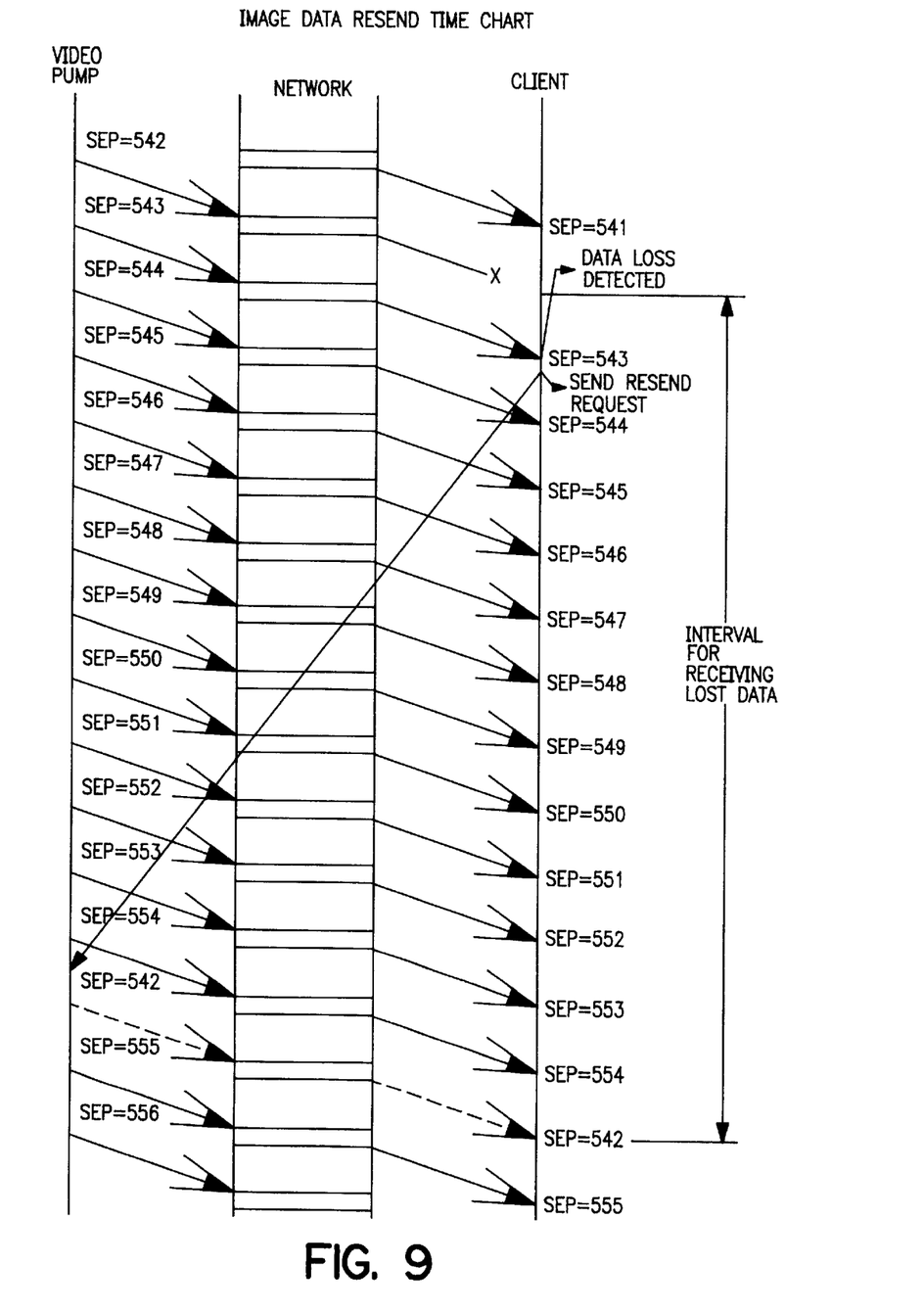
FIG. 9 is a time chart showing a resend process according to the present invention.

FIG. 9 shows a data flow when the resend request is issued. As shown in this figure, when data indicated by Sep=542 has disappeared from the data transmission and did not reach the client unit 2, the client unit 2 issues the resend request for the lost image data, and the corresponding image data is sent again from the video pump unit 1 as the data Sep=542.

In step S26, the write pointer CPTRw of the buffer 20 is incremented in order to reserve a region for the image data to be resent. Then, the sequence number CS is also incremented and the process goes to step S28.

Here, the following calculations are performed, if i image data disappear from the transmission, wherein i may be determined as received sequence number present sequence number.

(1) CPTRw=CPTRw+N*i (2) CS=CS+i

If the write pointer CPTRw becomes the end address CADRb or more during the calculation, the write pointer CPTRw is set to the leading address CADRt. In addition, if the sequence number CS exceeds 10000, the sequence number CS is set to 1.

In step S27, the image data resent according to the resend request is written in a portion of the buffer 20 which corresponds to the address stored in the buffer address column, at a line indicated by the sequence number detected in step S24. After step S27, the process goes to step S30.

In step S28, the image data received in step S21 is written in the buffer 20 at an address indicated by the write pointer CPTRw.

In step S29, the write pointer CPTRw is updated as follows.

(1) New CPTRw=CPTRw+n (2) If CPTRw+n becomes equal to or more than the end address CADRb of the buffer 20, the new CPTRw is set to the leading address CADRt.

In step S30, image data of m byte are read from a region pointed by the read pointer CPTRr in the buffer 20, and sent to the display unit 45.

In step S31, the read pointer CPTRr is updated as follows:

(1) New CPTRr=CPTRr+m;

(2) If CPTRr+m becomes equal to or more than the end address CADRb of the buffer 20, the new CPTRr is set to the leading address CADRt.

In step S32, whether or not the buffer 20 includes enough space for storing the next image data is determined. If yes (YES, in step S32), the process goes to step S21, and, if not (NO, in step S32), step S33 is performed. The following processes are performed in step S32.

(1) CPTRr is compared to CPTRw.

(2) If CPTRr is larger than CPTRw, a work variable p' is set as:

$$p'=CPTRr-CPTRw$$

(3) If CPTRr is not larger than CPTRw, the work variable p is set as:

$$p'=CADRb-CPTRw+CPTRr-CADRt$$

(4) The work variable p', which indicates an available region, is compared to a predetermined threshold value L', and it is determined that the buffer 20 is becoming full if the work variable p' is smaller than the threshold value L'.

In step S33, the send suspension request is transmitted to the video pump unit 1 in order to prevent an overflow of the buffer 20. After that, the process goes to step S21.

Figure 10:
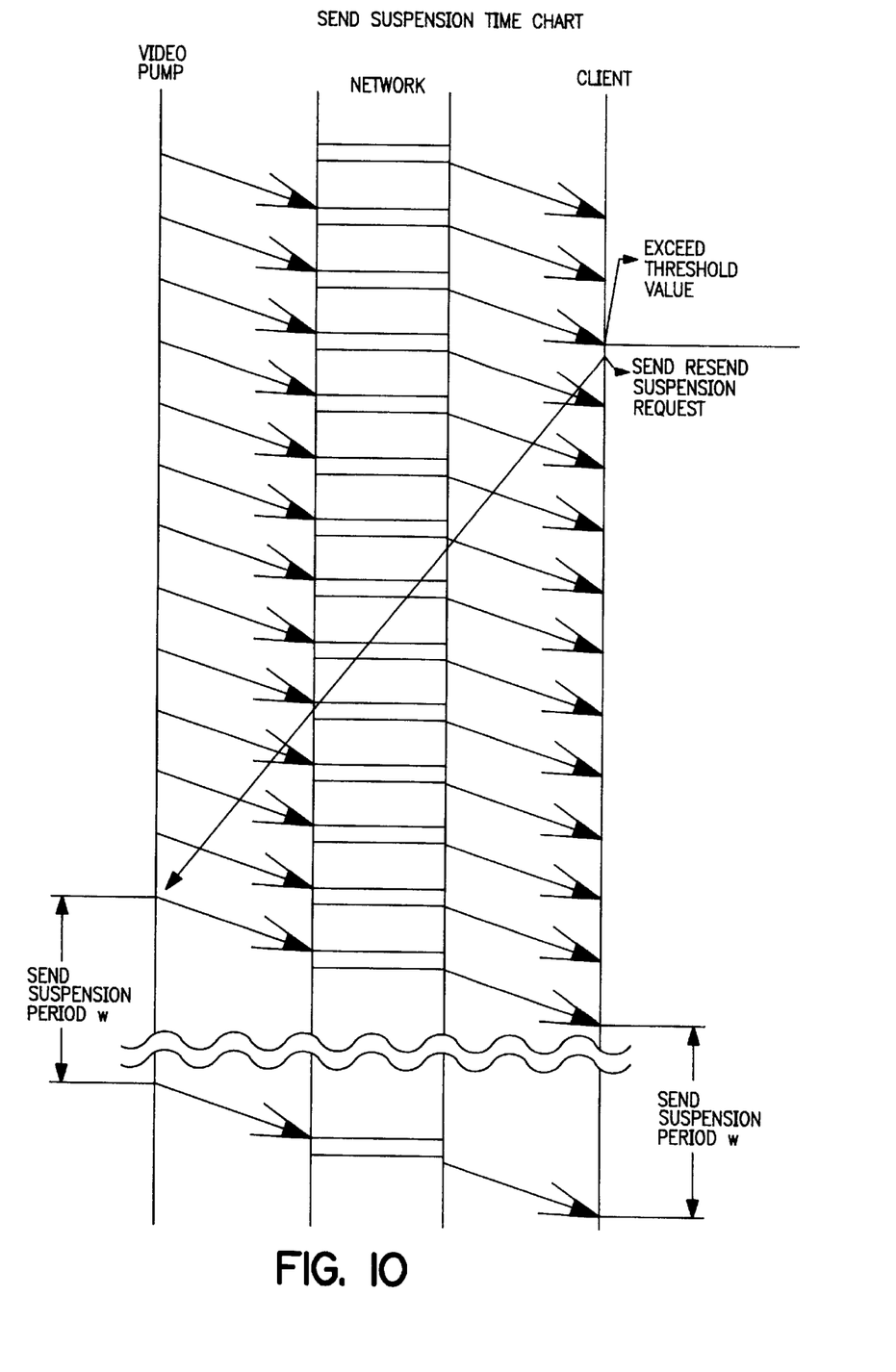
FIG. 10 is a time chart showing a send suspension process according to the present invention.

FIG. 10 shows a data flow when the send suspension request is issued. As shown in this figure, the video pump unit 1 stops transmitting the image data during a send suspension period w, if the send suspension request is issued by the client unit 2.

The steps S21 through S33 are repeated, and the process is terminated when a termination command is received from the user or all of the image data are displayed.

A request for releasing the send suspension may be sent to the video pump unit 1 from the client unit 2 after the send suspension request is sent. However, this causes an increase in the control signals transmitted between the client unit 2 and the video pump unit 1. In this embodiment, the client unit 2 does not send a request for releasing the send suspension to the video pump unit 1, and the send suspension is released after the predetermined send suspension period w, so that the video pump unit 1 restarts transmitting image data. Therefore, the number of control signals becomes lower than in the above case.

Figure 11:
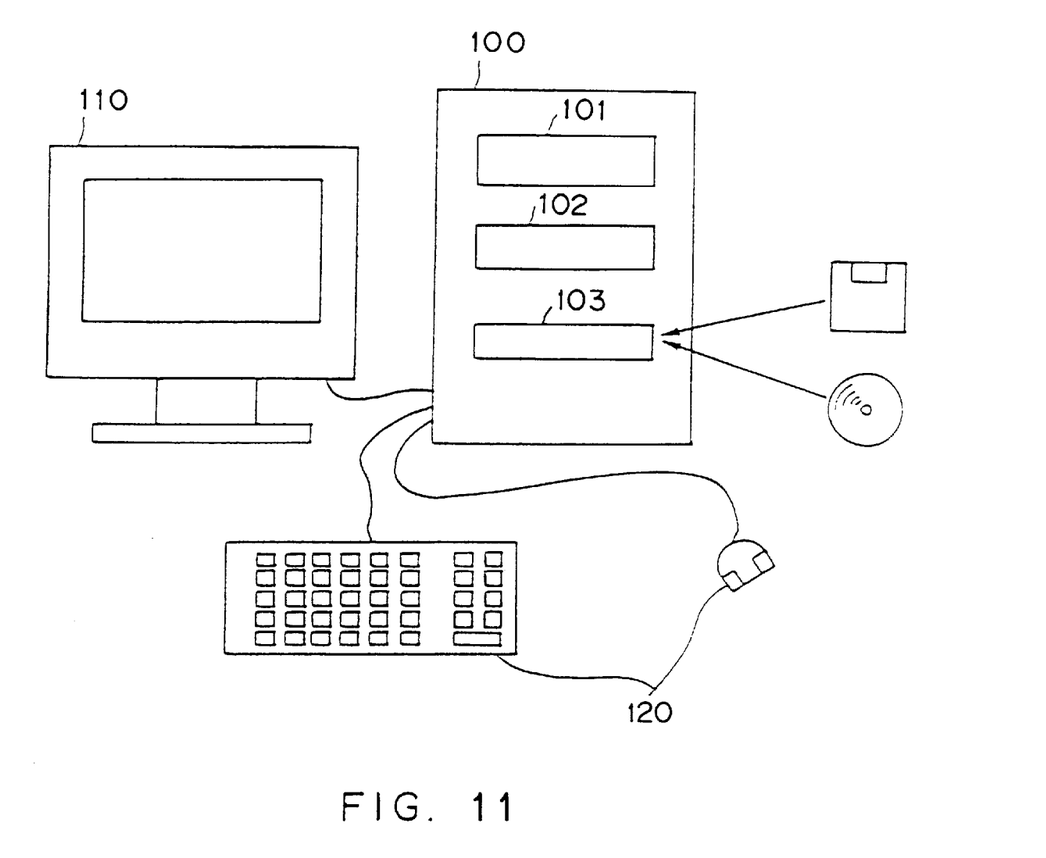
FIG. 11 shows a configuration of a computer system for realizing an image data transmission process according to the present invention.

FIG. 11 shows a configuration of a computer system which realizes the function of the video pump unit 1, client unit 2, or the image data transmission system according to the present invention, when the function is performed by computer programs.

This computer system comprises a computer 100, a display 110, and an entry device 120. The computer 100 comprises a processor 101, a memory 102, and a driver 103 for storage medium, and the entry device 120 includes a keyboard and a mouse.

The processor 101 performs the processes of the video pump unit 1 and/or the client unit 2 according to a computer program, and the memory 102 stores the computer program together with the data and files necessary for executing the computer program. The memory 102 may be used for the buffers 10 and/or 20 of the video pump unit 1 and/or the client unit 2. The driver 103 is used for exchanging programs and data between the computer 100 and external storage mediums.

When the computer program according to the present invention is stored in an external storage medium, the program is read into the computer 100 through the driver 103, and performed by the processor 101. In addition, this computer program may be stored in the memory 102. In this case, the external storage medium may be implemented by an optical medium, a magnetic medium, or a magneto-optic medium including a floppy disk, a CD-ROM, MD, or the like, and the memory 102 may be implemented by a hard disk, ROM, RAM, or the like.

The display 110 may be used for the display 26 of this invention and for displaying data necessary for executing the computer program. The entry device is used for inputting data and user's instructions for executing the computer program.

According to the present invention, an image data transmission which realizes a real time image display without disorders or interruptions even if a data loss occurs in the image data transmission, is achieved. As a result, a high-quality image supply in a video on demand service, is realized.

What is claimed is:

1. An image data transmission system for displaying image data, comprising:
    a video pump unit for forwarding image data, comprising
        a storage device storing forwarded image data, and
        a control device reading image data from said storage device and transmitting the read image data in response to a resend request;
    a client unit, comprising
        a data loss detector detecting a loss of image data transmitted from said video pump unit when a sequence number attached to image data received from said video pump unit does not match a checking sequence number in said client unit and does not exist in a resend management table which stores a resent requested sequence number, and
        a resend request generator generating said resend request; and
    said storage device of the video pump unit retains the image data previously transmitted to said client unit for retransmission to said client unit upon receipt of said resend request;
    said storage device flurther comprising a storage region for storing image data transmitted to a client unit, and an advance read region for storing a required amount of image data to transmit image data at a speed faster than a bit rate inherent in image data to be displayed; and
    a buffer control unit for controlling an advance read of image data to be transmitted to the advance read region while maintaining the storage region in such a way that an amount of the storage region becomes equal to or greater than a predetermined amount.

2. The image data transmission system according to claim 1, wherein
    said video pump unit further comprises a data sending device attaching a sequence number to image data to be transmitted for each transmission unit, and
    said data loss detector in said client unit detect a loss of image data based on sequence numbers attached to image data.

3. The image data transmission system according to claim 1, wherein said video pump unit further comprises a data sender transmitting image data at a speed faster than a transmission speed required to display image data in real time.

4. The image data transmission system according to claim 1, wherein
    said control device of said video pump unit suspend transmission of image data in response to a suspension request received from said client unit.

5. The image data transmission system according to claim 4, wherein
    said control device restart the transmission of image data after the expiration of a predetermined time interval, if the transmission of image data is suspended.

6. The image data transmission system according to claim 1, wherein
    said client unit further comprises a temporary storage device temporarily storing image data received from said video pump unit, and a send suspension request generator sending a suspension request to said video pump unit when an available space on said temporary storage device becomes smaller than a predetermined amount.

7. A video pump unit for forwarding image data to a client unit for displaying image data, comprising:
    a storage device storing said image data which had been previously transmitted to said client unit;
    a resend request detector detecting a resend request issued by said client unit which detects a loss of image data transmitted to said client unit when a sequence number attached to image data received from said video pump unit does not match a checking sequence number in said client unit and does not exist in a resend management table which stores a resend requested sequence number;
    a control device reading image data previously transmitted to said client unit from said storage device in response to said resend request;
    a data sending device transmitting image data read by said control device to said client unit;
    said storage device further comprising a storage region for storing image data transmitted to a client unit, and an advance read region for storing a required amount of image data to transmit image data at a speed faster than a bit rate inherent in image data to be displayed; and
    a buffer control unit for controlling an advance read of image data to be transmitted to the advance read region while maintaining the storage region in such a way that an amount of the storage region becomes equal to or greater than a predetermined amount.

8. The video pump unit according to claim 7, wherein
    said data sending device attach a sequence number to image data to be transmitted for each transmission unit, and
    said control device read image data corresponding to a sequence number received from said client unit from said storage device and send the read image data to said client unit.

9. The video pump unit according to claim 7, wherein said data sending device transmit image data at a speed faster than a bit rate inherent in image data to said client unit.

10. The video pump unit according to claim 7, wherein said control device reads image data from said resend region in response to said resend request and send the read image data to said data sending device.

11. The video pump unit according to claim 7, wherein said control device suspend transmission of image data in response to a suspension request received from said client unit and restart the transmission of image data after the expiration of a predetermined time interval.

12. A client unit for displaying image data received from a video pump unit, comprising:
   a data loss detection device detecting a loss of image data transmitted from said video pump unit when a sequence number attached to image data received from said video pump unit does not match a checking sequence number in said client unit and does not exist in a resend management table which stores a resend requested sequence number and outputting a data loss detection signal; and
   a resend request generating device generating a resend request for requesting said video pump unit to resend the lost image data.

13. The client unit according to claim 12, further comprising:
   a temporary storage device temporarily storing image data received from said video pump unit; and
   a send suspension request generating device sending a suspension request to said video pump unit when an available space on said temporary storage device becomes smaller than a predetermined amount.

14. An image data transmission method for transmitting image data to be displayed from a video pump unit to a client unit, comprising:
   storing image data transmitted to a client unit in a storage region, and storing a required amount of image data in an advance read region to transmit the image data at a speed faster than a bit rate inherent in the image data;
   controlling an advanced read of image data to be transmitted to an advance read region maintaining a storage region in such a way that an amount of image data to be stored in the storage region becomes equal to or greater than a predetermined amount;
   detecting a loss of said image data in a transmission from said video pump unit to said client unit when a sequence number attached to image data received from said video pump unit does not match a checking sequence number in said client unit and does not exist in a resend management table which stores a resend requested sequence number;
   requesting a resend of said image data stored in said storing step and previously transmitted to client unit to said video pump unit; and
   resending said image data which had been previously transmitted to said client unit in response to a resend request, whereby the detecting of the data loss and resending of the image occur in real-time.

15. The image data transmission method according to claim 14, further comprising:
   attaching a sequence number to image data to be transmitted to said client unit for each transmission unit; and
   detecting a loss of image data based on sequence numbers attached to received image data.

16. The image data transmission method according to claim 14, further comprising:
   transmitting image data to said client unit at a speed faster than a transmission speed required to display image data in real time.

17. The image data transmission method according to claim 14, further comprising:
   transmitting image data to said client unit at a speed faster than a bit rate inherent in image data to be transmitted.

18. The image data transmission method according to claim 14, further comprising:
   suspending transmission of image data in response to a suspension request received from said client unit.

19. The image data transmission method according to claim 18, further comprising:
   restarting the transmission of image data after the expiration of a predetermined time interval, if the transmission of image data is suspended.

20. The image data transmission method according to claim 14, further comprising:
   temporarily storing image data received from said video pump unit in a temporary storage device; and
   sending a send suspension request to said video pump unit when an available space on said temporary storage device becomes smaller than a predetermined amount.

21. A storage medium readable by a computer, tangibly embodying a program of instructions executable by the computer to perform method steps for forwarding image data to be displayed to a client unit, said method steps comprising:
   storing image data transmitted to a client unit in a storage region, and storing a required amount of image data in an advance read region to transmit the image data a speed faster than a bit rate inherent in the image data;
   controlling an advanced read of image data to be transmitted to an advance read region maintaining a storage region in such a way that an amount of image data to be stored in the storage region becomes equal to or greater than a predetermined amount;
   detecting a data resend request issued by said client unit which detects a loss of image data in a transmission to said client unit when a sequence number attached to image data received from said video pump unit does not match a checking sequence number in said client unit and does not exist in a resend management table which stores a resend requested sequence number;
   resending lost image data stored in said storing step to said client unit in response to said resend request.

22. The storage medium according to claim 21, wherein said method steps further comprise;
   attaching a sequence number to image data to be transmitted to said client unit for each transmission data unit; and
   resending image data corresponding to a sequence number notified from said client unit to said client unit.

23. The storage medium according to claim 21, wherein said method steps further comprise:
   transmitting image data to said client unit at a speed faster than a bit rate inherent in image data to be transmitted.

24. The storage medium according to claim 21, wherein said method steps further comprise:
   suspending transmission of image data in response to a suspension request received from said client unit.

25. A storage medium readable by a computer, tangibly embodying a program of instructions executable by the computer to perform method steps for displaying image data received from a video pump unit, said method steps comprising:

detecting a loss of image data in a transmission from said video pump unit when a sequence number attached to image data received from said video pump unit does not match a checking sequence number and does not exist in a resend management table which stores a resend requested sequence number; and requesting a resend of lost image data to said video pump unit in response to the detection of the loss of image data.

26. The storage medium according to claim 25, wherein said method steps further comprise;

temporary storing image data received from said video pump unit in a temporary storage device; and sending a send suspension request to said video pump unit when an available space on said temporary storage device becomes smaller than a predetermined amount.

27. An image data transmission system for displaying image data, comprising:

a video pump forwarding image data from an image data accumulation unit to a client at a speed faster than real time, retaining image data recently transmitted for a predetermined period of time;

the client comprising:

a client buffer which stores image data received from the video pump which will be displayed at a later time;

a data loss detector detecting a loss of image data stored in the client buffer when a sequence number attached to image data received from said video pump does not match a checking sequence number in said client buffer and does not exist in a resend management table which stores a resent requested sequence number, before the image data is displayed; and a resend request generate unit generating a resend request to the video pump if the data loss detector detects a loss of data, then causing the video pump to resend the lost data to the client before it is time for the lost data to be displayed in real time.

* * * * *